United States Patent
Bauer

(10) Patent No.: US 10,593,955 B2
(45) Date of Patent: Mar. 17, 2020

(54) METHOD FOR PRODUCING ELECTRODES HAVING AN IMPROVED CURRENT COLLECTOR STRUCTURE

(71) Applicant: Robert Bosch GmbH, Stuttgart (DE)

(72) Inventor: Harald Bauer, Ehningen (DE)

(73) Assignee: Robert Bosch GmbH, Stuttgart (DE)

( * ) Notice: Subject to any disclaimer, the term of this patent is extended or adjusted under 35 U.S.C. 154(b) by 198 days.

(21) Appl. No.: 15/702,276

(22) Filed: Sep. 12, 2017

(65) Prior Publication Data

US 2018/0076464 A1 Mar. 15, 2018

(30) Foreign Application Priority Data

Sep. 13, 2016 (DE) .................... 10 2016 217 383

(51) Int. Cl.
| | | |
|---|---|---|
| *H01M 4/72* | (2006.01) | |
| *H01M 4/13* | (2010.01) | |
| *H01M 4/139* | (2010.01) | |
| *H01M 4/66* | (2006.01) | |
| *H01M 4/70* | (2006.01) | |
| *H01M 2/26* | (2006.01) | |
| *H01M 2/30* | (2006.01) | |
| H01M 8/0247 | (2016.01) | |

(52) U.S. Cl.
CPC .............. *H01M 4/72* (2013.01); *H01M 2/26* (2013.01); *H01M 2/30* (2013.01); *H01M 4/13* (2013.01); *H01M 4/139* (2013.01); *H01M 4/661* (2013.01); *H01M 4/662* (2013.01); *H01M 4/70* (2013.01); *H01M 8/0247* (2013.01)

(58) Field of Classification Search
CPC .......... H01M 4/72; H01M 4/70; H01M 4/139; H01M 4/13; H01M 4/661; H01M 2/26; H01M 2/30; H01M 4/662; H01M 8/0247

USPC ........................................... 429/94
See application file for complete search history.

(56) References Cited

U.S. PATENT DOCUMENTS

| | | | |
|---|---|---|---|
| 2013/0017425 A1* | 1/2013 | Watanabe ........... | H01M 2/1077 429/94 |
| 2014/0272561 A1* | 9/2014 | Huang .................... | H01M 4/74 429/211 |
| 2015/0125756 A1 | 5/2015 | Kim et al. | |

FOREIGN PATENT DOCUMENTS

| | | |
|---|---|---|
| DE | 102010040538 A1 | 3/2012 |
| DE | 112012000876 T5 | 12/2013 |
| DE | 102013204863 A1 | 9/2014 |

* cited by examiner

*Primary Examiner* — Gary D Harris
(74) *Attorney, Agent, or Firm* — Norton Rose Fulbright US LLP; Gerard Messina

(57) ABSTRACT

A method for producing an electrode having an electrically conductive current collector layer having a terminal region for connection to an electrical power circuit, in which to improve the electrical discharge via the terminal region, the current collector layer has at least one structural element having an electrical conductivity that is increased compared to the current collector layer, through which structural element the electrical resistance between a point on the current collector layer and the terminal region is reduced, the method including: providing at least one free-standing active material foil; providing an electrically conductive layer on at least one surface of the active material foil, the electrically conductive layer being formed immediately on the surface of the active material foil to form the current collector layer; and connecting an electrical terminal region to the electrically conductive layer to enable connection to an electrical power circuit.

10 Claims, 2 Drawing Sheets

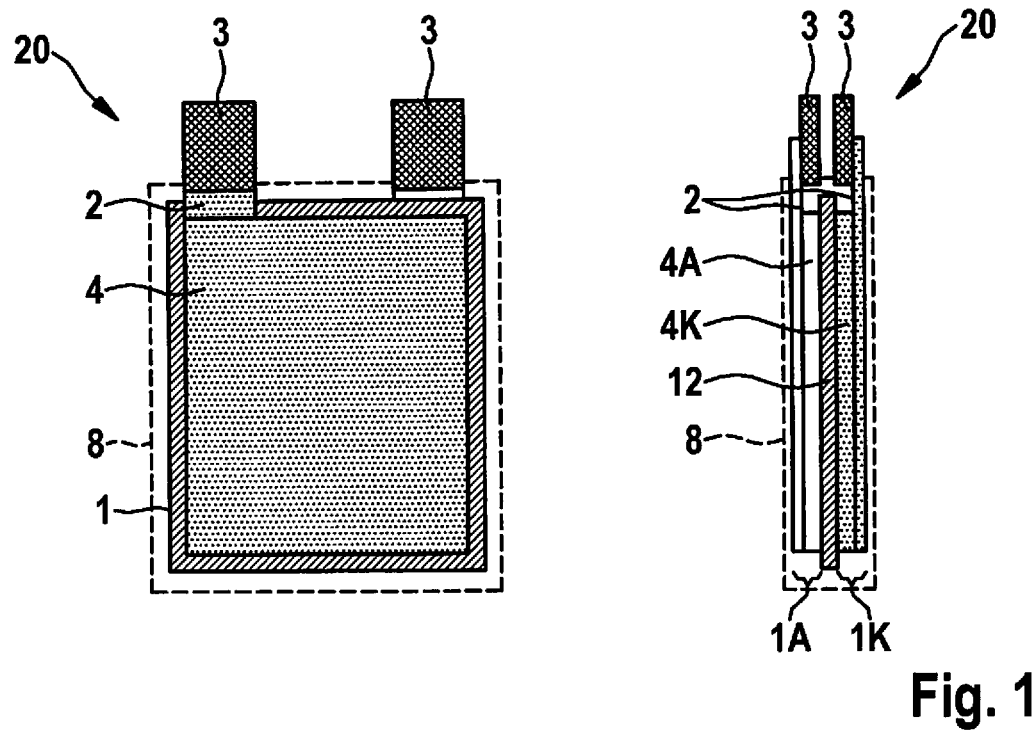
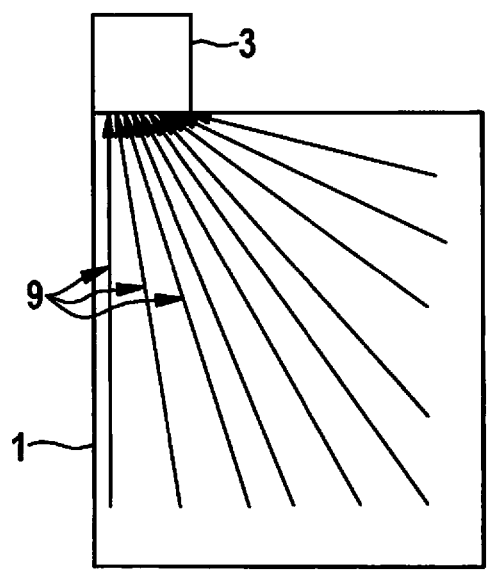
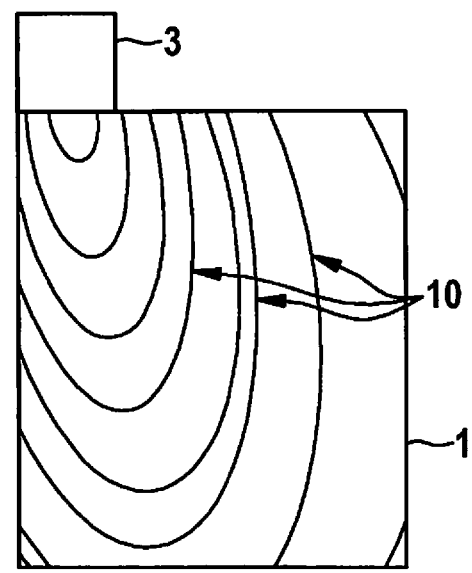
Fig. 2     Fig. 3

METHOD FOR PRODUCING ELECTRODES HAVING AN IMPROVED CURRENT COLLECTOR STRUCTURE

RELATED APPLICATION INFORMATION

The present application claims priority to and the benefit of German patent application no. 10 2016 217 383.9, which was filed in Germany on Sep. 13, 2016, the disclosure of which is incorporated herein by reference.

FIELD OF THE INVENTION

The present invention relates to methods for producing electrodes having improved current collector structures for conducting away electrical energy in batteries, such as a lithium-ion battery. In particular, the present invention relates to a method in which the current collector structure is applied onto a free-standing active material foil.

BACKGROUND INFORMATION

For the production of batteries, such as lithium-ion batteries, standardly an active material layer is applied onto an electrically conductive current collector. As an active material layer, for example pastes containing graphite or nanocrystalline amorphous silicon having lithium deposits, or also pastes including mixed oxides containing lithium such as $Li_4Ti_5O_{12}$, $LiCoO_2$, $LiNiO_2$, $LiMn_2O_4$, lithium iron phosphate ($LiFePO_4$), or tin dioxide ($SnO_2$), are applied onto a bearer foil acting as a current collector. As bearer foils, for example copper foils or aluminum foils can also be used. Bearer foils coated in this way can be used as negative electrodes (so-called anodes) and/or positive electrodes (so-called cathodes) in batteries, a separator being provided between the anode and the cathode. Electrode stacks (e.g. anode-separator-cathode) as a rule form a square packet. Alternatively, an anode-separator-cathode unit can be rolled up. The units are placed into a housing, e.g. in the form of a pouch.

The packagings obtained in this way are filled with an electrolyte. Suitable electrolytes include for example salts such as $LiPF_6$ or $LiBF_4$ in anhydrous aprotic solvents such as ethylene carbonate or diethylene carbonate, etc. Also suitable are polymers of polyvinylidene fluoride (PVDF) or poly(vinylidene fluoride-co-hexafluoropropene) (PVDF-HFP) as well as lithium phosphate nitride ($Li_3PO_4N$). These can be present and used both in liquid form and as a gel or solid.

Via the electrically conductive arresters, which must have a cross-section adequate for the current strength that they are to handle, such a cell can be electrically contacted. This arrester thus also acts as terminal region.

For an efficient overall system, as a rule a plurality of small cells are connected together with a high wiring outlay. Alternatively, it is possible to produce correspondingly large-surface electrodes in order to avoid such a wiring outlay.

During the charging and discharging of such a battery, there is now the difficulty that the current produced incrementally in the surface of the electrode flows from all regions of the electrode in the direction of the current collector. As a result, the current density in the electrode increases continuously in the direction of the current collector.

Frequently, the current conducting is associated with losses that appear as a local heating of the battery. In particular, disturbance points in the ideal configuration, such as non-uniform coating, excessively large particles in the layer, non-homogenous pressing on of the electrodes, or the like, additionally cause a non-homogenous current flow in the electrode. This can therefore result in an overheating of the battery, locally or zonally, which can cause premature aging, loss of capacitance, or thermal damage to the battery.

Patent document DE 11 2012 000 876 discusses the use of a partly porous aluminum body as current collector. This body is obtained through electrochemical deposition of aluminum on a polymer foam, removal of the polymer, and partial compression of the aluminum network.

Patent document US 2014/0272561 discusses an electrode including a current collector having a network structure. The current collector can be produced by pressure or deposition methods.

Patent document US 2015/0125756 also relates to a method for producing an electrode in which a current collector is provided in the form of a network. The active material is subsequently applied thereon.

For reasons of stability, the known methods use either current collector foils having a sufficient layer thickness to be capable of being handled by machine without being destroyed, or include an additional bearer material. From the point of view of the performance of the electrode, however, a realization that is as thin as possible of the current collector is desirable, because this collector does not make any contribution to the actual energy storage. Instead, the current collector increases the volume and the weight of the battery, and thus reduces the achievable energy density of the battery. This object is achieved by the invention described below.

SUMMARY OF THE INVENTION

The present invention provides a method for producing an electrode that has an electrically conductive current collector layer having a terminal region for connection to an electrical current circuit, the so-called arrester, which is characterized in that in order to improve the electrical conducting away via the terminal region, the current collector layer has at least one structural element having an electrical conductivity that is increased compared to the current collector layer, through which the electrical resistance between a point on the current collector layer and the terminal region is reduced, the method including the steps:

a) provision of at least one free-standing active material foil;
b) provision of an electrically conductive layer on at least one surface of the active material foil, the electrically conductive layer being formed immediately on the active material foil in order in this way to form the current collector layer;
c) connecting an electrical terminal region to the electrically conductive layer in order to enable connection to an electrical power circuit.

Surprisingly, it has turned out that through the provision of such a structural element the danger of a local or zonal overheating of the battery can be significantly reduced or even avoided, and that an electrode having such a structuring can easily be produced starting from a free-standing active material foil. Through the proposed method, the material quantity of the current collector can be matched individually to the particular conditions and requirements of the electrode, and thus the material quantity can be reduced overall.

The active material foil is a free-standing active material foil and can be provided by all methods known to those skilled in the art. The production can for example take place using a slurry application method in which a slurry including at least one active material, at least one binding agent, and, if warranted, conductive additives in a solvent (e.g. N-methylpyrrolidone) is provided and is applied on a surface of a bearer material (e.g. a plastic foil). After removing the solvent and, if warranted, compressing the obtained active material layer, this layer can be detached from the bearer material surface and used as a free-standing active material foil. Alternatively, the free-standing active material foil can be produced in a method that does not use solvents, or is largely free of solvents, by processing a composition including at least one active material, at least one binding agent, and, if warranted, conductive additives, under the action of shear forces in such a way that binding agent fibrils form that bond the individual components of the composition to one another. A paste-like, shapeable mass is obtained that can be processed to form a free-standing active material foil through application onto a surface and compression if warranted.

The free-standing active material foil includes in each case at least one active material and at least one binding agent that may be present in the form of fibrils, as well as, if warranted, conductive additives. This can be for example conductive carbon black or graphite. In a specific embodiment, the active material foils have graphite particles on at least a portion of the surfaces. For the production of the free-standing active material foil a dry active material composition may be used. The active material composition can have known components for a corresponding energy storage device. For the nonlimiting example case of the production of an electrode for a lithium-ion battery, the active material for an anode can for example include graphite, which may be in a concentration greater than or equal to 94 wt %, whereas the active material for a cathode can for example include a lithium salt, such as lithium nickel cobalt manganese oxide (NCM) or lithium manganese oxide (LMO), which may be in a concentration greater than or equal to 93 wt %. The active material is thus in particular a material, or a substance or substance mixture, that can take part in the active charge processes or discharge processes of an energy storage device. Here, the active material mixture can in addition have a binding agent such as polyvinylidene fluoride (PVDF), which may be in a concentration less than or equal to 4 wt %, in which the active material described above is distributed. In addition, a conductive additive, such as conductive carbon compounds, for example carbon black, can be added in a concentration of less than or equal to 2 wt %. Through fibrillation processes, a pastelike shapeable compound can be formed from the composition. Such methods are known from the existing art and are described for example in EP 1 644 136, US 2015/0061176 A1, or US 2015/0062779 A1. The obtained shapeable compound can then be shaped to form a free-standing active material foil. This can be done using a calender.

The free-standing active material foil has a layer thickness that permits handling without destruction. The active material foil may have a layer thickness (foil thickness) of at least 50 μm, e.g. 100 to 500 μm, in particular 150 to 300 μm.

As an additional component, in a specific embodiment the active material composition can include at least one solid-body electrolyte, in particular an inorganic solid-body electrolyte, that is capable of conducting ions, in particular lithium ions. According to the present invention, such solid inorganic lithium ion conductors include crystalline, composite, and amorphous inorganic solid lithium-ion conductors. Crystalline lithium-ion conductors include in particular lithium-ion conductors of the perovskite type, lithium lanthanum titanate, lithium-ion conductors of the NASICON type, lithium-ion conductors of the LISICON and thio-LISICON type, and lithium-ion-conducting oxides of the garnet type. The composite lithium-ion conductors include in particular materials that contain oxides and mesoporous oxides. Such solid inorganic lithium-ion conductors are described for example in the article by Philippe Knauth, "Inorganic solid Li ion conductors: An overview," Solid State Ionics, vol. 180, issues 14-16, 25 Jun. 2009, pages 911-916. According to the present invention, all solid lithium-ion conductors can also be included that are described by C. Cao et al. in "Recent advances in inorganic solid electrolytes for lithium batteries," Front. Energy Res., 2014, 2:25. In particular, the garnets described in EP 1723080 B1 are also included according to the present invention. The solid-body electrolyte can be used in particular in the form of particles having an average particle diameter of 0.05 μm to <5 μm, which may be 0.1 μm to 2 μm. If the active material composition includes a solid-body electrolyte, this can for example make up 0 to 50 wt %, which may be 10 to 40 wt %, of the active material composition.

In a second step, a layer of an electrically conductive material is formed on at least a part of the surface of the active material foil. This layer is used in the later electrode as current collector, and is configured according to standard methods in such a way that the local current conductivity is adequate and the mechanical processing is ensured. As an electrically conductive material, a material may therefore be used that is known to those skilled in the art for use as a current collector material. Suitable materials from which the conductive structures can be formed in such a case are for example copper, aluminum, nickel, palladium, silver, gold, tin, or also alloys of these metals, also with other metals.

In an embodiment of the present invention, the conductive structural element is formed by grid-shaped or lead-shaped structural elements, and/or forms a gradual curve of the thickness of the electrically conductive layer.

In a further embodiment of the present invention, structural elements are applied onto the free-standing active material foil galvanically, using pressure techniques, and/or using joining techniques.

"Galvanically applied" means that metal layers are deposited on the surface of the free-standing active material foil. This can take place both auto-catalytically, or also using a suitable deposition current as direct-current or also pulsed current. In principle, here all galvanic methods known from the field of circuit board production can also be used for the application of the structures. The structures can be deposited in any thickness. They may be deposited in a thickness between 5 μm and 500 μm. Deposition in such a thickness provides on the one hand an adequate conductivity of the structure, and on the other hand the weight applied by the structure can be kept low. As the germ of the galvanic deposition, which may be graphite particles on the surfaces of the free-standing active material foils are used.

Suitable materials from which the conductive structures can be formed in such a case are for example copper, palladium, silver, gold, tin, or also alloys of these metals, also with other metals.

In addition to purely applicative methods, material-removing methods can also be used in which a metallic layer is first applied onto a free-standing active material foil and is then removed partially or gradually, possibly using a photoresist and a mask.

It can also be provided that for example using a photoresist and a mask a suitable structure is applied on an active material foil, and in an etching step superfluous material is removed.

In this way, the weight of the electrically conductive structure is reduced, and at the same time conductive structural elements are formed.

However, the structures can also be applied onto the free-standing active material foil using pressure techniques also known from the area of circuit board production. Here, in particular methods such as screen printing, transfer printing, blade printing, offset printing, spraying, spin coating, or stamping are suitable. As materials, here conductive inks or also conductive polymers can be used.

In a further embodiment of the present invention, it can be provided to use a combination of a printing technique and galvanic deposition to form the conductive structural elements. Here, in a first step structures are applied onto the foil using pressure techniques, and in a further method step the structures are galvanically metallized on using a deposition current. In this way, adequately conductive structural elements are created in a corresponding manner on the free-standing active material foil. In addition, the conductive structures can also be applied onto the free-standing active material foil using joining techniques. Here, the conductive structures are produced separately ahead of time and are subsequently joined to the free-standing active material foil. For this, techniques such as gluing using conductive glues, welding, soldering, and pressing are for example suitable.

In a specific embodiment, the conductive structural element is achieved for example through the use of thin metal foils provided with a pattern of slits (gradual if warranted). By stretching the metal foil in the direction orthogonal to the orientation of the slits of the pattern, in this way the slits can be widened to form holes. In the terminal region, i.e. in the vicinity of the arrester, the metallic portion may predominate, while in areas further away the portion of metal may be smaller. This metallic foil can be applied onto the free-standing active material foil, and can be made to adhere thereto by heating the binding agent. An additional galvanic application of a further metallic layer can also bring about adhesion.

In a particularly specific embodiment of the present invention, the current collector layer is provided in such a way that there results a gradual curve of the overall thickness of the current collector layer from the end remote from the arrester of the active material foil to the arrester at the closest region. The electrical resistance of the current collector layer here decreases gradually from the end further away towards the arrester.

Such a structure can advantageously be realized through galvanic deposition methods. For this purpose, the fact can be exploited that in galvanic deposition of the metallic layer, the free-standing active material foil acts as cathode and the distance from the anode is selected such that the regions of the free-standing active material foil that are to be provided with a metallic layer having a larger layer thickness are situated at a smaller distance from the surface of the anode than are the regions of the free-standing active material foil that are to be provided with a metallic layer having a smaller layer thickness. Thus, in the region having a smaller distance between the cathode and the anode, during the galvanization process a higher current density is achieved than in the region having a larger distance between the cathode and the anode (cf. Hull cell). During the galvanization, in this way a current collector layer is deposited on the free-standing active material foil whose layer thickness has a continuous gradient and reaches its maximum in the regions having the highest current density or the lowest electrode distance during the galvanization process. The layer thickness of the current collector layer and its layer thickness curve can in this way be optimally controlled.

A further free-standing active material foil may be applied onto the electrodes obtained according to the described method, made up of free-standing active material foil and current collector layer, so that a laminate is obtained of two active material foils and a current collector layer situated between them. In this way, the portion of the active material in the electrode is advantageously further increased.

At least two electrodes can be joined to form an electrode stack, the electrodes being realized in alternating fashion as negative and positive electrode, and a separator being provided between the individual electrodes. Through electrical connection of the respective anode and cathode to one another, a negative and positive pole of an electric chemical cell are formed. Such electrochemical cells, produced according to the method of the present invention, can be used, in joined fashion, as electrochemical energy storage systems, and can in particular advantageously be used as drive batteries in automotive applications. A further area of application of electrodes produced according to the method of the present invention is in particular fuel cells.

The method described above makes it possible to produce an electrode having an improved current collector structure, such that the portion of current collector material can be significantly reduced compared to conventionally produced electrodes. The ratio of active material to current collector material is thereby improved, and the potential energy density of the electrode is increased.

The electrically conductive structure increases the conductivity of the electrode in a freely selectable direction, so that the voltage drop can be kept small, in particular over large electrode surfaces. Local disturbances also have a much smaller effect, because a current path adequately dimensioned by the structural element can trap current peaks.

A further advantage is the possibility of using current collector layers having low conductivity or thickness. In conventional current collector layers, the thickness of the layer has to be selected such that already before the arrester that is to be connected, the thickness of the layer is adequately such that the current will not be unnecessarily limited. The same quantity of current occurs in each surface region of the electrode. However, the arrester is provided only in a particular region of the electrode, so that in the vicinity of the arrester the current collector layer also has to transport the current quantities occurring in the surface regions situated further away from the arrester. When there is a theoretical halving of the electrode surface, the surface half that bears the arrester then has to have twice the thickness of the second surface half in order to ensure adequate current transport. The method described here makes it possible to adapt the thickness of the current collector layer to the current quantities occurring in the respective region of the electrode, and in this way to optimize the ratio of current collector material to active material.

In the following, the present invention is further explained on the basis of Figures and examples.

BRIEF DESCRIPTION OF THE DRAWINGS

FIG. 1 shows the general design of an electrochemical cell.

FIG. 2 shows the current flow in an electrode according to the existing art.

FIG. 3 shows the temperature distribution in an electrode according to the existing art.

DETAILED DESCRIPTION

Figure 4:
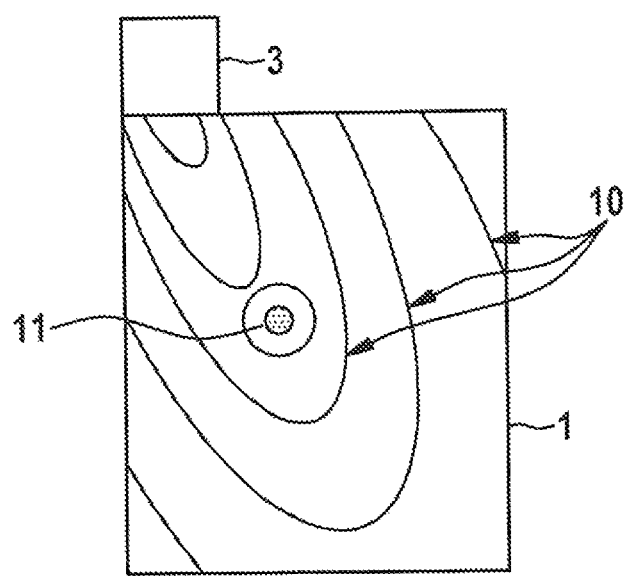
FIG. 4 shows the temperature distribution in an electrode according to the existing art with the presence of a defect.

FIG. 1 shows the general configuration of an electrochemical cell 20. Electrochemical cell 20 is made up of an anode 1A and a cathode 1K, separated from one another by a separator 12. Separator 12 is electrically insulating, but is transparent for ions. Suitable materials for use as separators 12 include for example microporous plastics, glass fiber nonwovens, or polyethylene nonwovens. Cathode 1K and anode 1A are each made of at least one free-standing active material foil 4, in particular an anode active material foil 4A or a cathode active material foil 4K, and a current collector layer 2 applied thereon. Current collector layer 2 can be made for example of copper, nickel, or aluminum, and can be applied onto active material foil 4 using a galvanic method or a pressure method. As cathode material, for example lithium mixed oxides such as $Li_4Ti_5O_{12}$, $LiCoO_2$, $LiNiO_2$, $LiMn_2O_4$, or lithium iron phosphate ($LiFePO_4$), can be used. As anode material, for example pastes containing graphite, nanocrystalline amorphous silicon or tin dioxide ($SnO_2$) can be used. Electrodes 1 have a terminal region 3 acting as an electrical arrester, via which there takes place an electrical contacting of electrodes 1 to a power circuit. The depicted sequence of anode 1A, cathode 1K, and separator 12 can be repeated in sandwiched fashion in order to obtain battery cells having a higher power. The cells are insulated from the surrounding environment by a housing 8.

FIG. 2 shows, in abstracted form, the flow of current inside an electrode 1 of a battery according to the existing art, shown here for an anode 1A. The electron flow 9 produced or occurring in the electrode surface is symbolized by the arrows. In the case of anode 1A, during the discharge process the current flows from the surface in the direction of terminal region 3, and in the case of cathode 1K the current correspondingly flows in the reverse direction, from terminal region 3 in the direction towards the surface of electrode 1. In the vicinity of terminal region 3 there prevails an increased current density, because the overall electrical power of electrode 1 has to be conducted via this region, in the manner of a bottleneck.

FIG. 3 shows the temperature distribution in an electrode 1 according to the existing art. With increasing vicinity to terminal region 3, the density of isotherms 10 increases. The current density increased in the surrounding environment of terminal region 3 causes increased heat radiation in this region, due to the electrical resistance of electrode 1, which in the extreme case can cause thermal overloading of the battery. When there is such a thermal overloading, thermal damage can occur to the electrolytes, the electrode material, or to current collector layer 2, which can cause total loss of functionality of the cell. In particular when there are defects 11 in electrode 1, as shown in FIG. 4, thermal effects can occur inside the electrode surface. Such defects 11 can occur for example due to non-uniform coating of current collector layer 2 with active material, excessively large particles in the active material, or non-uniform pressing of electrodes 1 against separator 12. Such defects 11 also form regions of increased electrical resistance or increased current density, and as a result thermal effects can occur there.

Figure 5:
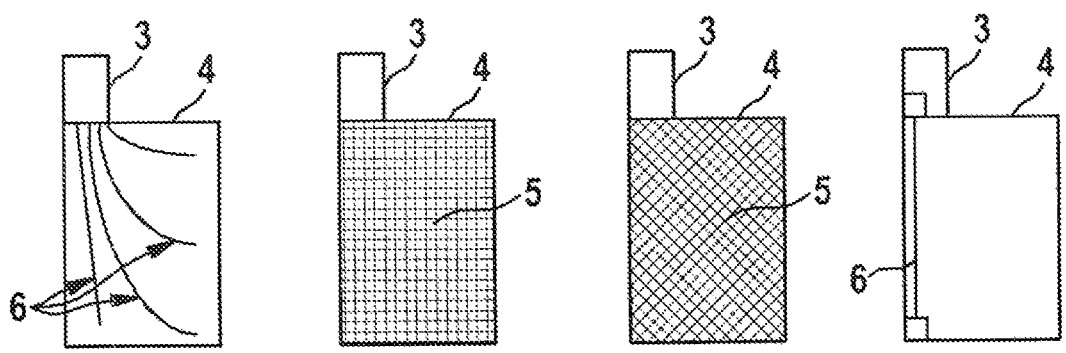
FIG. 5 shows electrodes produced according to the present invention having electrically conductive structural elements.

FIG. 5 shows electrodes 1 according to the present invention having electrically conductive structural elements 5, 6. Electrically conductive structural elements 5, 6, in the form of grids and/or leads, are applied onto an active material foil 4. Structural elements 5, 6 can be applied onto active material 4 galvanically, using pressure techniques, and/or using joining techniques. Through conductive structural elements 5, 6 applied onto active material foil 4, in particular grid-shaped or lead-shaped structural elements 5, 6, there result paths of high conductivity from the electrode surface in the direction of terminal region 3 (in the case of anode 1A), or going out from terminal region 3 in the direction of the electrode surface (in the case of cathode 1K). In this way, current density peaks in the surrounding environment of terminal region 3 are prevented, whereby thermal loads in this region can also be avoided. Because electrically conductive structural elements 5, 6 as a rule have good thermal conductivity in addition to good electrical conductivity, structural elements 5, 6 also enable the removal or distribution of locally occurring thermal peaks, so that a thermal overloading can be prevented on the one hand by the reduced electrical resistance and on the other hand by the distribution of locally occurring thermal energy to additional regions. Both the electrical and the thermal loading are thus distributed more uniformly to the overall surface electrode 1. In this way, not only is the load reduced in the surrounding environment of terminal region 3, but also the punctiform loads, occurring due to possible surface defects, in electrode 1 are reduced.

Figure 6:
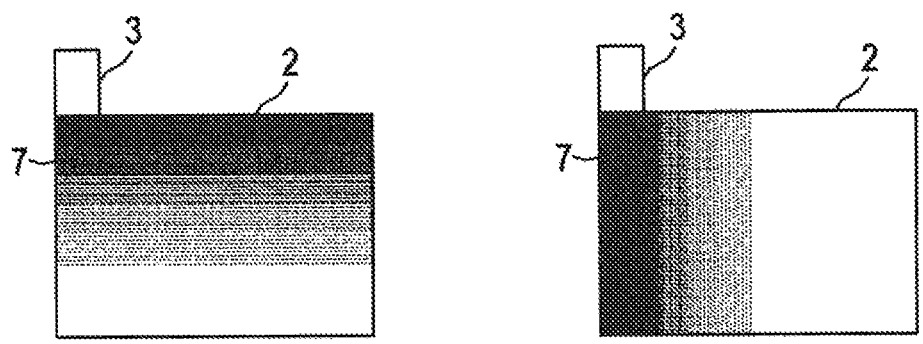
FIG. 6 shows electrodes produced according to the present invention having a current collector layer having a gradual curve of the layer thickness of the current collector layer.

FIG. 6 shows an electrode 1 according to the present invention having a current collector layer 2 having a gradual curve 7 of the layer thickness. Here, according to the present invention a gradual curve 7 of the layer thickness of current collector layer 2 is to be understood as meaning that the electrical and/or thermal resistance of current collector layer 2 decreases continuously in the direction of terminal region 3. This can for example take place in that, with increasing closeness to terminal region 3, the layer thickness of current collector layer 2 continuously increases. As explained above, this can take place using galvanic techniques, pressure techniques, or joining techniques. To this extent, in such an embodiment according to the present invention the electrically conductive structural elements 5, 6 are fashioned as surfaces. The gradual curve 7 of the layer thickness of current collector layer 2 may be obtained at least partly through a galvanic method in which the gradient of the layer thickness of the current collector is achieved through a distance gradient to the counter-electrode.

The present invention is not limited to the exemplary embodiments described here and the aspects emphasized herein. Rather, within the scope indicated by the claims, a large number of modifications are possible that are within the competence of those skilled in the art.

What is claimed is:

1. A method for producing an electrode, the method comprising:
   providing at least one free-standing active material foil;
   providing an electrically conductive layer on at least one surface of the active material foil, the electrically conductive layer being formed immediately on the surface of the active material foil in this manner to form the current collector layer;

connecting an electrical terminal region to the electrically conductive layer to enable connection to an electrical power circuit;

wherein the electrode has an electrically conductive current collector layer having a terminal region for connection to an electrical power circuit, and wherein to improve the electrical discharge via the terminal region, the current collector layer has at least one structural element having an electrical conductivity that is increased compared to the current collector layer, through which structural element the electrical resistance between a point on the current collector layer and the terminal region is reduced, wherein the current collector layer includes a gradual layer thickness curve that continuously decreases as the distance from the electrical terminal region increases.

2. The method of claim 1, wherein the structural element is formed by grid-shaped or lead-shaped structural elements and/or by a gradual curve of the layer thickness of the electrically conductive current collector layer.

3. The method of claim 1, wherein the structural elements are applied onto the free-standing active material foil galvanically, using pressure techniques, and/or using joining techniques.

4. The method of claim 1, wherein the free-standing active material foil includes at least one active material and at least one fibrillated binding agent.

5. The method of claim 1, wherein the current collector layer includes at least one element selected from copper, aluminum, nickel, or an alloy of at least one of these metals.

6. The method of claim 1, wherein the current collector layer is applied onto the free-standing active material foil at least partly with the aid of a galvanic process.

7. The method as recited in claim 1, wherein the gradual layer thickness curve of the current collector layer is provided in that during the galvanic deposition of the electrically conductive layer the free-standing active material foil acts as a cathode, and the distance from the anode is selected such that regions of the free-standing active material foil which are to be provided with a current collector layer having a larger layer thickness are to be situated at a smaller distance from the surface of the anode than are the regions of the free-standing active material foil that are to be provided with a current collector layer having a smaller layer thickness.

8. An electrode, comprising:
an electrode arrangement, including:
at least one free-standing active material foil;
an electrically conductive layer on at least one surface of the active material foil, the electrically conductive layer being formed immediately on the surface of the active material foil in this manner to form the current collector layer;

an electrical terminal region connected to the electrically conductive layer to enable connection to an electrical power circuit;

wherein the electrode has an electrically conductive current collector layer having a terminal region for connection to an electrical power circuit, and wherein to improve the electrical discharge via the terminal region, the current collector layer has at least one structural element having an electrical conductivity that is increased compared to the current collector layer, through which structural element the electrical resistance between a point on the current collector layer and the terminal region is reduced, wherein the current collector layer includes a gradual layer thickness curve that continuously decreases as the distance from the electrical terminal region increases.

9. The electrode of claim 8, wherein the electrode is used in an electrochemical energy storage system or in a fuel cell.

10. An electrochemical energy storage system, comprising:
at least one electrode, including:
at least one free-standing active material foil;
an electrically conductive layer on at least one surface of the active material foil, the electrically conductive layer being formed immediately on the surface of the active material foil in this manner to form the current collector layer;

an electrical terminal region connected to the electrically conductive layer to enable connection to an electrical power circuit;

wherein the electrode has an electrically conductive current collector layer having a terminal region for connection to an electrical power circuit, and wherein to improve the electrical discharge via the terminal region, the current collector layer has at least one structural element having an electrical conductivity that is increased compared to the current collector layer, through which structural element the electrical resistance between a point on the current collector layer and the terminal region is reduced, wherein the current collector layer includes a gradual layer thickness curve that continuously decreases as the distance from the electrical terminal region increases.

* * * * *